(12) United States Patent
Pinvidic et al.

(10) Patent No.: US 8,274,749 B1
(45) Date of Patent: *Sep. 25, 2012

(54) DATA WEDGE FORMAT TABLE SYNCHRONIZATION

(75) Inventors: Daniel R. Pinvidic, San Juan Capistrano, CA (US); Lim Hudiono, Laguna Niguel, CA (US); Stanley K. Cheong, Lake Forest, CA (US)

(73) Assignee: Marvell International Ltd., Hamilton (BM)

( * ) Notice: Subject to any disclaimer, the term of this patent is extended or adjusted under 35 U.S.C. 154(b) by 61 days.

This patent is subject to a terminal disclaimer.

(21) Appl. No.: 13/084,449

(22) Filed: Apr. 11, 2011

Related U.S. Application Data

(63) Continuation of application No. 11/879,614, filed on Jul. 18, 2007, now Pat. No. 7,924,521.

(60) Provisional application No. 60/910,937, filed on Apr. 10, 2007.

(51) Int. Cl.
*G11B 5/09* (2006.01)

(52) U.S. Cl. ............... 360/51; 360/48; 360/53; 711/112

(58) Field of Classification Search .................. None
See application file for complete search history.

(56) References Cited

U.S. PATENT DOCUMENTS

| | | | |
|---|---|---|---|
| 5,278,703 A | | 1/1994 | Rub et al. |
| 5,388,013 A * | | 2/1995 | Nakamura ................ 360/48 |
| 5,650,882 A | | 7/1997 | Tsurumi et al. |
| 5,748,401 A * | | 5/1998 | Kawai ..................... 360/78.14 |
| 5,818,654 A * | | 10/1998 | Reddy et al. .................. 360/53 |
| 5,890,209 A * | | 3/1999 | Dobbek ..................... 711/112 |
| 6,018,435 A * | | 1/2000 | Uno et al. .................. 360/78.14 |
| 6,038,619 A * | | 3/2000 | Berning et al. ................ 710/33 |
| 6,154,331 A | | 11/2000 | Hanna |
| 6,167,461 A * | | 12/2000 | Keats et al. ..................... 710/5 |
| 6,195,217 B1 | | 2/2001 | Park |
| 6,195,222 B1 * | | 2/2001 | Heminger et al. ......... 360/78.07 |
| 6,204,984 B1 * | | 3/2001 | Uno et al. ..................... 360/69 |
| 6,219,729 B1 | | 4/2001 | Keats et al. |
| 6,295,176 B1 | | 9/2001 | Reddy et al. |
| 6,381,659 B2 * | | 4/2002 | Proch et al. .................... 710/57 |
| 6,470,461 B1 * | | 10/2002 | Pinvidic et al. ............. 714/6.13 |
| 6,710,960 B1 * | | 3/2004 | Yorimitsu ..................... 360/69 |
| 6,862,151 B2 * | | 3/2005 | Hoskins et al. ................ 360/53 |
| 6,961,877 B2 * | | 11/2005 | Si et al. .......................... 714/49 |
| 7,287,102 B1 | | 10/2007 | White et al. |
| 7,609,468 B2 | | 10/2009 | Pinvidic et al. |
| 7,870,346 B2 * | | 1/2011 | Byers et al. .................. 711/150 |
| 7,904,644 B1 * | | 3/2011 | Pinvidic et al. .............. 711/112 |
| 7,924,521 B1 * | | 4/2011 | Hudiono et al. ............... 360/51 |
| 2002/0069321 A1 * | | 6/2002 | Dickinson et al. ............ 711/113 |
| 2002/0071193 A1 * | | 6/2002 | Ogawa et al. ................. 360/31 |
| 2005/0041322 A1 * | | 2/2005 | Kagami et al. ............. 360/77.02 |
| 2005/0289261 A1 * | | 12/2005 | White et al. ................... 710/74 |

\* cited by examiner

*Primary Examiner* — Dismery Mercedes

(57) ABSTRACT

A control module for a rotating storage medium. The control module includes: a memory, a buffer control module, and a disk formatter module. The memory is configured to store a data wedge format table including a plurality of entries. The buffer control module is configured to maintain a queue, wherein each of a plurality of entries of the queue is based on a corresponding one of the plurality of entries of the data wedge format table, and wherein each of the plurality of entries of the queue includes a servo number. The disk formatter module is configured to compare the servo numbers of the plurality of entries of the queue to present servo information, wherein the present servo information is based on a present position of a read/write device in relation to the rotating storage medium.

20 Claims, 9 Drawing Sheets

| CRC | Reserve | First Sector ID | First Sector Delay | Words to Split | First Sector Delay |

| CRC Good Status | Servo Number | CRC | Reserve | First Sector ID | First Sector Delay | Words to Split | First Sector Delay |

DATA WEDGE FORMAT TABLE SYNCHRONIZATION

CROSS-REFERENCE TO RELATED APPLICATIONS

This application is a continuation of U.S. patent application Ser. No. 11/879,614 (now U.S. Pat. No. 7,924,521), filed on Jul. 18, 2007, which claims the benefit of U.S. Provisional Application No. 60/910,937, filed Apr. 10, 2007. The disclosures of the applications referenced above are incorporated herein by reference.

FIELD

The present disclosure relates to rotating storage devices, and more particularly to read/write channel data paths and synchronization of data therein.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

The speed at which a rotating data storage device, such as a magnetic or an optical storage device, executes read and write operations affects the performance of a computer or other host device. A rotating data storage device may be, for example, a hard disk drive (HDD), a compact disc (CD) drive, a digital versatile disc (DVD) drive or a high definition/high data storage disc drive. Operational delay in the rotating data storage device can cause a corresponding delay in operation of the host device.

Typically, a HDD includes a read/write channel with a disk formatter that performs a read or a write operation on one or more magnetic disks. Each disk includes tracks that store data. The tracks are divided into wedges or sectors. Servo numbers may identify servo areas between sectors. A read/write head or read/write device is used to read from or write to the sectors. In use, the HDD receives a command signal that identifies a target sector or a block of target sectors for a read/write operation.

Current read/write operations have associated delays. As an example, in performing a write operation for a predetermined number of target sectors, a command signal for data to be written is generated. Based on the command signal, the read/write channel receives the data in one sector increments. The sectors are handled one at a time and in a sequential format. Each sector is stored in memory associated with the read/write channel and provided to the disk formatter. Upon error correction coding and data formatting of a current sector, the read/write channel receives a next or subsequent sector. Speed of the read/write channel is limited based on such data transfer.

SUMMARY

In general, in one aspect, this specification discloses a control module for a rotating storage medium. The control module includes: a memory, a buffer control module, and a disk formatter module. The memory is configured to store a data wedge format table including a plurality of entries. The buffer control module is configured to maintain a queue, wherein each of a plurality of entries of the queue is based on a corresponding one of the plurality of entries of the data wedge format table, and wherein each of the plurality of entries of the queue includes a servo number. The disk formatter module is configured to compare the servo numbers of the plurality of entries of the queue to present servo information, wherein the present servo information is based on a present position of a read/write device in relation to the rotating storage medium.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 4A illustrates a buffer memory DWFT word format in accordance with an embodiment of the present disclosure;

FIG. 4B illustrates a buffer controller queue entry for a DWFT word in accordance with an embodiment of the present disclosure;

DETAILED DESCRIPTION

Figure 1:
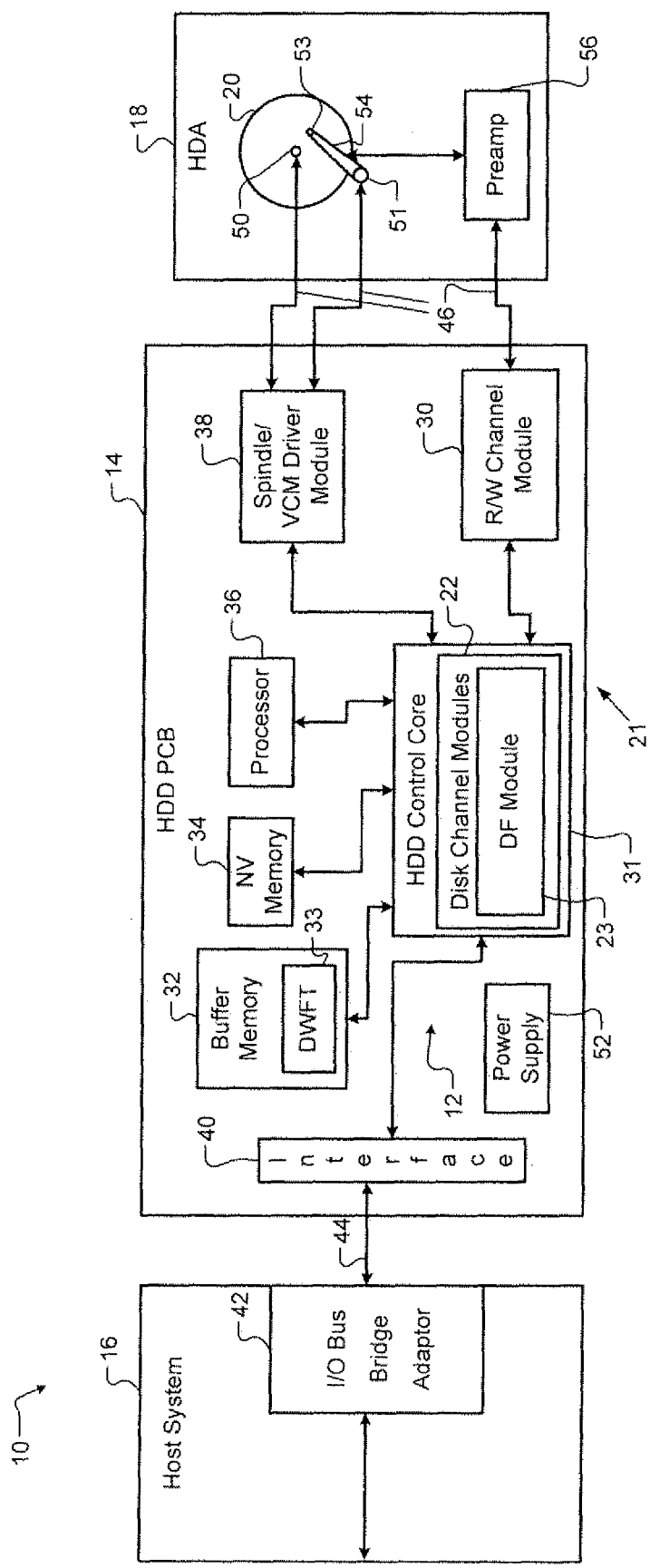
FIG. 1 is a functional block diagram of a hard disk drive system incorporating a hard disk drive control module in accordance with an embodiment of the present disclosure.

The following description is merely exemplary in nature and is in no way intended to limit the disclosure, its application, or uses. For purposes of clarity, the same reference numbers will be used in the drawings to identify similar elements. As used herein, the terms module and state machine refer to Application Specific Integrated Circuits (ASICs), electronic circuits, processors (shared, dedicated, or grouped) and memories that execute one or more software or firmware programs, combinational logic circuits, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

The present disclosure relates to synchronizing servo number counting in a disk formatter (DF) with servo number counting for a data wedge format table (DWFT) in buffer memory. The DF may include a servo counter module that maintains a current servo number count based on extracted servo numbers from a hard disk drive (HDD) control module. Previous disk formatters received servo numbers that were not current because of various processing steps that were required to deliver the servo numbers. Therefore, previous disk formatters or other HDD modules compensated those servo numbers for processing latencies. In contrast the current servo numbers do not need to be compensated for latencies.

In the present disclosure, the HDD control module may determine/extract a servo number that indicates a real-time or current position of the read/write head on a track. This may be prior to read/write operations. A DWFT may include wedge format information, such as a track map, and may be generated by the HDD control module. The track map may include a map of servos and sectors on a track. X entries from the DWFT are queued in a DWFT control module of a buffer control module where they are associated with X servo numbers. The DF receives at least some of the X entries.

The DF compares a current servo number in the servo counter module to a servo number for one of the DWFT entries. If the servo numbers match, the DWFT is in synch with the servo. Otherwise, the DF may use a DWFT entry that corresponds to the correct servo number for disk formatting or read/write operations. The servo numbers may be out of synch because the extracted servo number may be determined as the read/write head is transitioning to a new sector, while the servo number for the DWFT entry may correspond to the previous sector.

Referring now to FIG. 1, a functional block diagram of a hard disk drive (HDD) system 10 incorporating a HDD control module 12 is shown. The HDD system 10 includes a HDD printed circuit board (PCB) 14 that is coupled to a host system 16 and a hard disk assembly (HDA) 18. The HDD PCB 14 reads from and writes to sectors of a rotating storage medium 20 of the HDA 18 via the HDD control module 12. The HDD includes a read/write channel (DC) 21 through which it performs read/write tasks via read/write channel modules 22 such as the DF module 23.

The HDD PCB 14 also includes a read/write channel module 30, a buffer memory 32 that may include a DWFT 33, a nonvolatile memory 34, a processor 36, and a spindle/voice-coil motor (VCM) driver module 38. The read/write channel module 30 processes data received from and transmitted to the HDA 18. The FWD control module 12 includes a HDD control core 31 that controls components of the HDA 18 and communicates with an external device, such as the host system 16 via an I/O interface 40. The I/O interface 40 is in communication with an I/O bus bridge adaptor 42 of the host system 16 via an advanced technology attachment (ATA) bus 44. The host system 16 may include a computer, a multimedia device, a mobile computing device, etc. The I/O interface 40 may include wireline and/or wireless communication links.

The HDD control module 12 may receive data from the HDA 18, the read/write channel module 30, the buffer memory 32, the nonvolatile memory 34, the processor 36, the spindle/VCM driver module 38, and/or the I/O interface 40. The read/writ channel module 30 and the spindle/VCM driver module 38 are in communication with the HDA 18 via HDA communication lines 46. The processor 36 may process the data, including encoding, decoding, filtering, and/or formatting. The processed data may be output to the HDA 18, the read/write channel module 30, the buffer memory 32, the nonvolatile memory 34, the processor 36, the spindle/VCM driver module 38, and/or the I/O interface 40.

The HDD control module 12 may use the buffer memory 32 and/or the nonvolatile memory 34 to store data related to the control and operation of the HDD 10. The buffer memory 32 may include dynamic random access memory (DRAM), synchronous DRAM (SDRAM), and/or other memory types. The buffer memory 32 may store the DWFT 33.

The nonvolatile memory 34 may include flash memory (including NAND and NOR flash memory), phase change memory, magnetic RAM, and/or multi-state memory, in which each memory cell has more than two states. The spindle/VCM driver module 38 controls a spindle motor 50 and a VCM 51. The HDD PCB 14 also includes a power supply 52 that provides power to the components of the HDD 10.

The HDA 18 includes the rotating storage medium 20. The HDA 18 further includes a read/write device, such a read/write head 53. The read/write device may be arranged on an actuator arm 54, as shown, and read and write data on the rotating storage medium 20. Additionally, the HDA 18 includes the spindle motor 50 that rotates the rotating storage medium 20 and the VCM 51 that actuates the actuator arm 54. A preamplifier device 56 amplifies signals generated by the read/write device during read operations and provides signals to the read/write device during write operations.

Figure 2:
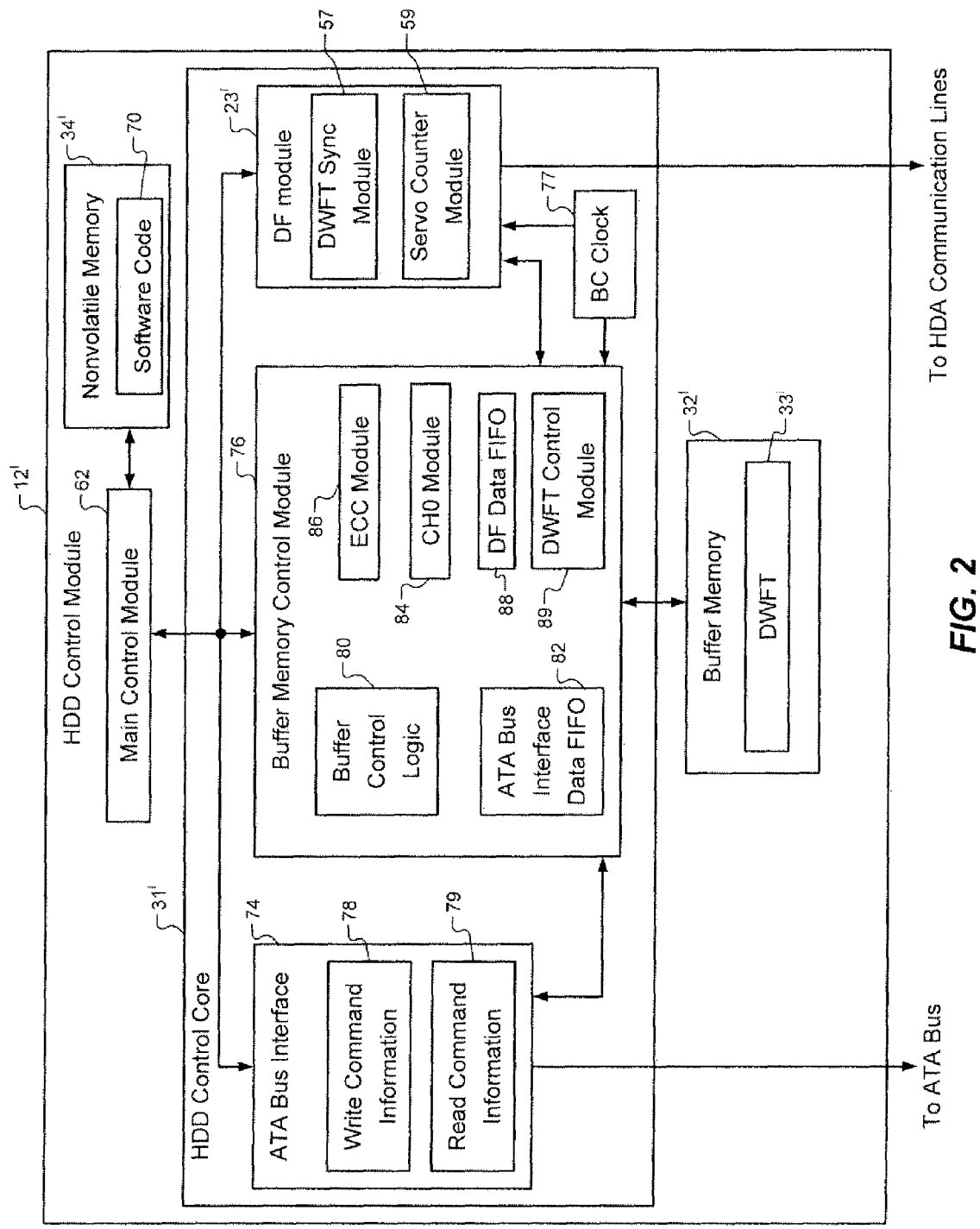
FIG. 2 is a functional block diagram of a hard disk drive control module incorporating a disk formatter in accordance with an embodiment of the present disclosure.

Referring now to FIG. 2, a functional block diagram of a HDD control module $12^I$ incorporating the DF module $23^I$ is shown. The DF module $23^I$ may include a DWFT synchronization module 57 that may synchronize an extracted servo number with a servo number in a DWFT entry. The extracted servo number may be stored in a servo counter module 59.

The HDD control module $12^I$ includes a main control module 62, a buffer memory $32^I$, a nonvolatile memory $34^I$ and a HDD control core $31^I$. The HDD control core $31^I$ handles data flow between a host bus and HDA communication lines. The host bus may be the ATA bus 44 or other host bus, such as a small computer standard interface (SCSI) or fibre channel port. The HDD control module $12^I$ transfers data between a rotating storage medium and the buffer memory $32^I$, transfers data between the buffer memory $32^I$ and an ATA bus, and performs error correction and cyclical redundancy check (CRC) calculations.

The HDD control core $31^I$ is controlled by the main control module 62, which executes software/firmware code 70 in the nonvolatile memory $34^I$. In addition to reading from and writing to a rotating storage medium, the main control module 62 handles tasks, such as moving a read/write head to a proper track and/or sector position.

The buffer memory $32^I$ may buffer data between the rotating storage medium 20 and the ATA bus 44. This compensates for delays, latency, and timing differences between the rotating storage medium and the ATA bus. The HDD control core $31^I$ also includes an ATA bus interface 74. As mentioned, the buffer memory $32^I$ may include a DWFT $33^I$. The buffer memory $32^I$ may also include DRAM. In some configurations, the buffer memory $32^I$ serves as the memory for the main control module 62. The DF module $23^I$ receives data from the buffer memory $32^I$ through a buffer control module 76, formats the data, and sends the data to the read/write head 53.

The HDD control core $31^I$ also includes a buffer controller clock 77 that provides a clock signal to the DF module $23^I$ and the buffer control module 76. The buffer controller clock 77 may also provide the clock signal to the ATA bus interface 74. The ATA bus interface 74 implements ATA bus protocols to receive write command signals and read command signals having write command information 78 and read command information 79, respectively. The ATA bus interface 74 passes the write command information 78 and the read command information 79 to the buffer memory 32$^I$ through the buffer control module 76. The ATA bus interface 74 also has protocols for transmission of read data from a rotating storage medium to a host system.

The buffer control module 76 may control interleaved access to the buffer memory 32$^I$ by the DF module 23$^I$, the ATA bus interface 74, and the main control module 62. The buffer control module 76 may also arbitrate access of buffered data between the buffer memory 32$^I$ and the DF module 23$^I$, the ATA bus interface 74, and the main control module 62. The buffer control module 76 includes buffer control logic 80, an ATA bus interface data first-in-first-out (FIFO) buffer 82, a channel (CH)0 module 84, an error correction code (ECC) module 86, one or more read/write channel or DF data FIFOs 88, and a DWFT control module 89.

Figure 3:
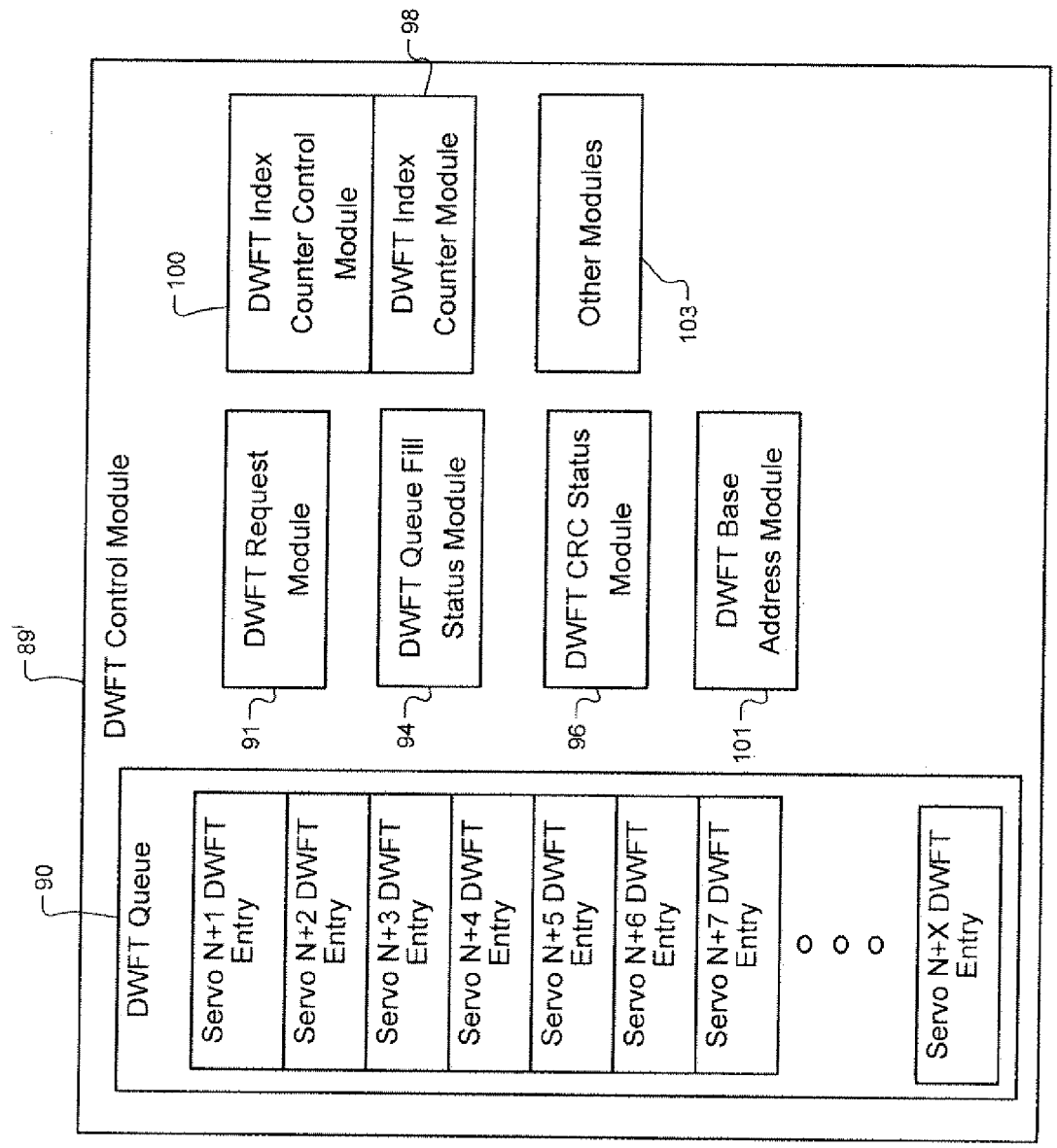
FIG. 3 is a block diagram of a data wedge format table (DWFT) control module in accordance with an embodiment of the present disclosure.

Referring now to FIG. 3, the DWFT control module 89$^I$ may include a DWFT request module 91 that may request multiple entries from the DWFT 33 during a single buffer access. The DWFT request module 91 may store the entries in a DWFT queue 90. The DWFT entries may correspond to servo numbers N+1, N+2, . . . , and N+X from the DWFT 33. A DWFT synchronization module 57 of the DF module 23 may synchronize the DWFT entries with servo numbers in the servo counter module 59.

As an illustrative example, for X=8, when the DF module 23 requests a DWFT entry for servo number 10, the buffer controller provides DWFT entries for servo numbers 5 to 13. If the DWFT entry for servo number 10 matches information from the servo counter module 59 for servo number 10, then the DF may determine that the read/write head and servo information in the DF module 23 are synchronized. Otherwise, the DF module 23 determines the DWFT entry that matches the servo number and uses that DWFT entry for formatting or read/write operations.

Referring now to FIGS. 4A and 4B, an exemplary format for a DWFT word 92 within the buffer memory 33 is illustrated. The DWFT word 92 may include bits designated for CRC, reserved operations, first sector ID, number of sectors, words to split, and first sector delay. Further, an exemplary format for a DWFT entry 93 in the DWFT control module queue 90 is illustrated. The DWFT entry 93 may include bits designated for CRC good status, servo number, CRC, reserved operations, first sector ID, number of sectors, words to split, and first sector delay.

A DWFT queue fill status module 94 may monitor the DWFT queue 90 for empty spaces. A DWFT CRC status module 96 may check the CRC of the DWFT entry 93 and the DWFT word 92 before using the DWFT entries. The DWFT CRC status module 96 may signal an error condition based on the CRC status with a CRC good status bit. The DF module 23 may interrupt read/write operations and signal an error condition based on the CRC status.

The DWFT control module 89$^I$ counts servo numbers in a DWFT index counter module 98 starting with a base servo number that may be stored in a DWFT base address module 101. The DF module 23 may provide the base servo number. The DWFT control module 89$^I$ includes the index counter servo number in the DWFT entry 93 of FIG. 4B. Further, an index counter control module 100 may "or" the output of the DWFT index counter module 98 and a DWFT base address to generate an address of the buffer DWFT word 92 in the buffer memory.

The index counter control module 100 may increment the DWFT index counter module 98 by one after fetching a DWFT entry from the buffer memory. The index counter control module 100 may reset the index counter module 98 to zero if the index counter module 98 reaches a maximum servo number. The DWFT control module 89$^I$ may also include other modules 103.

The DF module 23 may discard the DWFT entry for servo N+1 and read the next DWFT entry (for N+2) if the DWFT control module 89$^I$ delivers the DWFT entry too late to be used for a first synchronization attempt.

In FIG. 2, the buffer control logic 80 may control the functionality of the buffer control module 76. The ATA bus interface data FIFO 82 buffers data between the ATA bus interface 74 and the buffer memory 32$^I$. The CH0 module 84 and the ECC module 86 are part of a read/write channel, which may be referred to as a CH0. The read/write channel facilitates data transfer between the buffer memory 32$^I$ and the rotating storage medium. The CH0 module 84 communicates with the buffer memory 32$^I$. The ECC module 86 generates ECC bits, which are combined with received data prior to writing to the rotating storage medium. The ECC bits may be encoded prior to being written to a rotating storage medium and may be decoded upon being read from the rotating storage medium for error detection and correction purposes. The read/write channel data FIFOs 88 buffer data between the buffer memory 32$^I$ and the DF module 23 and may be part of the CH0 module 84 and/or the ECC module 86.

Any of the control modules 23$^I$, 62, 76, 84, 86 of the HDD control module 12$^I$ may receive physical sector identification addresses and convert them to logical block addresses (LBAs). The LBAs may be converted to sector numbers and track numbers that may be stored.

Figure 5:
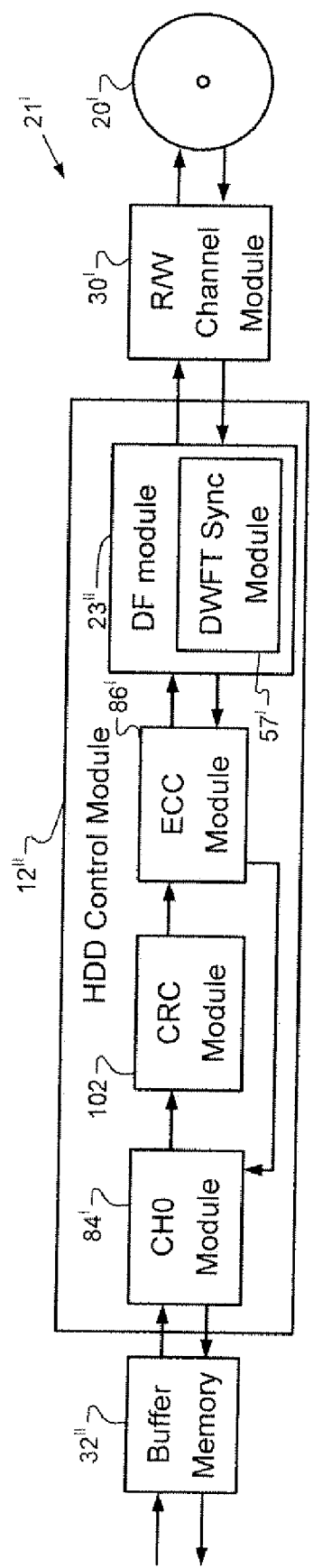
FIG. 5 is a block diagram of a read/write channel in accordance with an embodiment of the present disclosure.

Referring now to FIG. 5, a block diagram of a read/write channel 21$^I$ is shown. The read/write channel 21$^I$ includes a HDD control module 12$^I$ that processes sector data to and from a rotating storage medium 20$^I$ via a read/write channel module 30$^I$. The HDD control module 31$^{II}$ includes a CH0 module 84$^I$ that communicates sector data to and from a buffer memory 32$^{II}$. A CRC module 102 performs a CRC check on data received from the CH0 module 84$^I$ prior to passage to an ECC module 86$^I$. The ECC module 86$^I$ adds or removes error correction coding bits to the CRC checked data or from formatted data received from the DF module 23$^I$. The DF module 23$^I$ formats error correction coded data from the ECC module and formats data received from a rotating storage medium 20$^I$ based on information within a sector request queue. A read/write channel module is coupled between the DF module 23$^I$ and a rotating storage medium 20$^I$.

Figure 6:
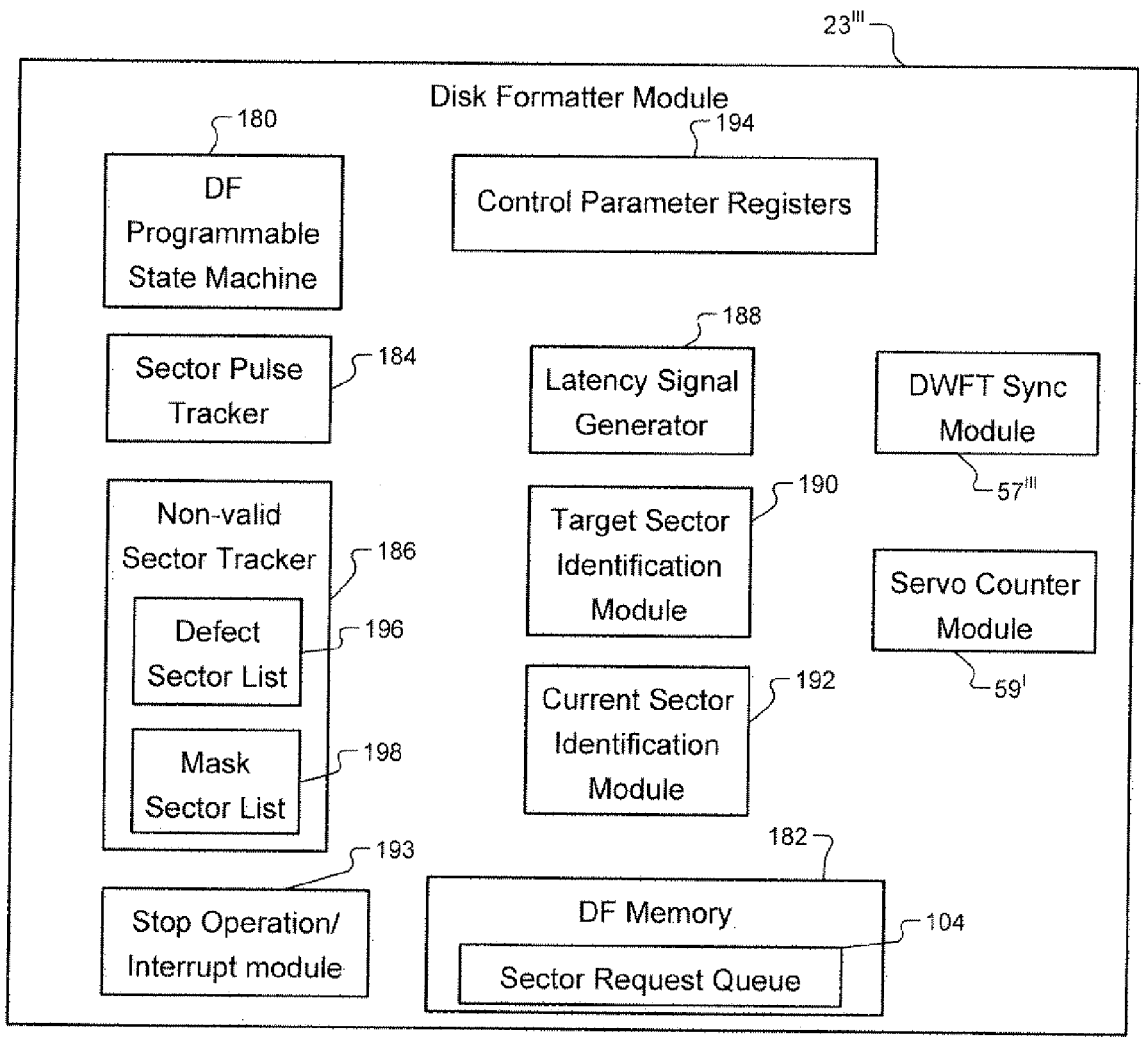
FIG. 6 is a block diagram of a disk formatter in accordance with an embodiment of the present.

Referring to FIG. 6, a block diagram of a DF module 23$^{III}$ is shown. The DF module 23$^{III}$ includes a DWFT synchronization module 57$^I$, a servo counter module 59$^I$, a DF programmable control module or state machine 180 and a sector request queue 104$^I$. The DF state machine 180, in general, controls the operation of the DF module 23$^{III}$. The sector request queue 104$^I$ includes various read/write channel information and may be stored in DF memory 182. The DF module 23$^{III}$ may also include a sector pulse tracker 184, a non-valid or defective sector tracker 186, a latency signal generator 188, and a target sector identification module (TSIM) 190. The DF module 23$^{III}$ may also include a DWFT synchronization module 57$^{II}$, a current sector identification module (CSIM) 192, a stop operation/interrupt generation module 193, and various control parameter registers 194. The control parameter registers 194 may be responsive to any or all of the aforementioned modules.

The sector pulse tracker 184 detects sector pulses, which aid in identifying a current sector. When a read/write head passes over the beginning of a sector, that sector has an associated identification pulse that is generated and detected by the sector pulse tracker 184. The sector pulse tracker 184 may be used in tracking sector pulses for identification and detection of a target sector.

The non-valid sector tracker 186 includes a defective sector list 196 and/or a masked list 198. The defective sector list 196 includes identification addresses, sector numbers and/or track numbers of defective sectors. The masked sector list 198 includes identification addresses, sector numbers and/or track numbers of sectors that have been masked. A valid sector is a sector that is not defective or masked. A sector may be masked when it is defective, contains an error, or for some other reason. When a sector is masked, it may be skipped or ignored, such that it is not involved in a read/write operation. The sector pulse tracker 184 and the non-valid sector tracker 186 may be stored in and/or have associated memory.

The latency signal generator 188 generates a latency signal. The latency signal is associated with the lead time or preparation time to perform a read/write operation to a rotating storage medium. The extent of the preparation time is referred to as the preparation period. The preparation period may include calculation time, register load time, data transfer time, etc. The preparation period may include time to determine a current sector, time to load of control parameter information into registers, and time to load data into a buffer.

When in the read/write ready mode the DF module $23^{III}$ is ready to read from or write to a rotating storage medium upon detection of a target start sector and/or a command start sector. A target start sector may be a first sector in a block of target sectors on which to perform a read/write operation, relative to the corresponding track. A command start sector refers to a sector within a block of target sectors on which to start a read/write operation. The command start sector may be any non-defective/non-masked sector in a track including the target start sector.

The TSIM 190 determines the block of target sectors to perform a read/write operation. The TSIM 190 may receive command signals, such as from a HDD control module, a host system control module, or elsewhere. Based on the signals, the TSIM 190 may determine a set of desired sectors on which to perform the read/write operation. The TSIM 190 may convert LBAs into sector and track numbers. The TSIM 190 may determine the appropriate target sectors based on information in the defective sector list and the masked sector list.

The CSIM 192 determines the current sector over which a read/write head is positioned. The CSIM 192 may determine the current sector based on information received from the sector pulse tracker.

The control parameter registers 194 may include a target start LBA register, a target end LBA register, a target sector block register, a target start sector register, a target end sector register, and a buffer sector size register. The registers 194 may also include a buffer memory address pointer register, a clock per sector register, a command latency register, and other registers. The control parameter registers 194 may also include skip sector registers associated with defective sectors or masked sectors, such as that in the defective list 196 and the masked list 198.

As discussed previously, the synchronization module $57^I$ may synchronize respective servo numbers between a DWFT entry and the servo counter module $59^I$. The synchronization module $57^I$ may also initialize the buffer control module 76 with a DWFT base address, a maximum servo number, and a next servo number count, which may be set to N+1.

Figure 7:
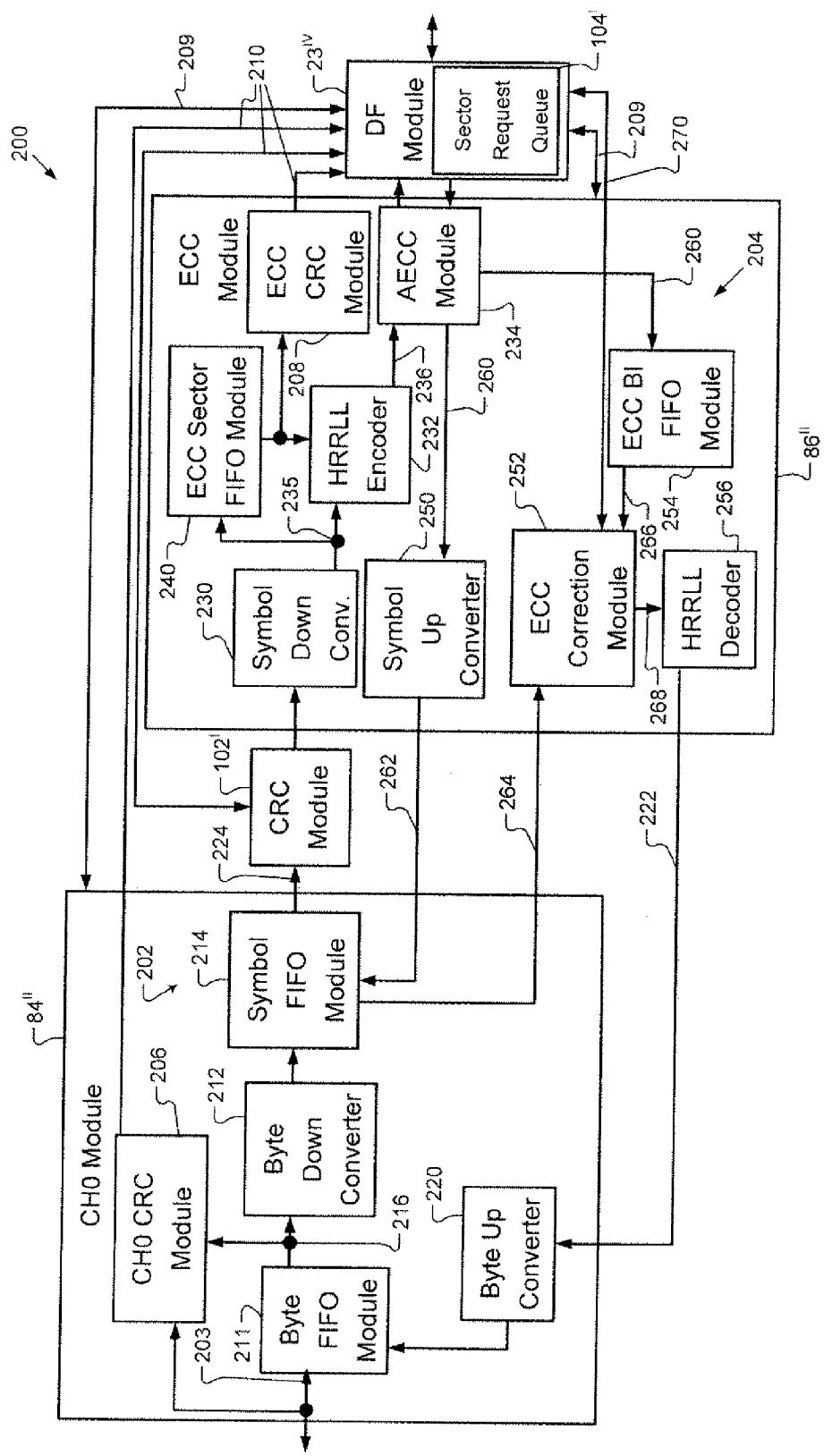
FIG. 7 disclosure is a block diagram of a read/write channel portion of a HDD control module in accordance with an embodiment of the present disclosure.

Referring now to FIG. 7, a block diagram of a read/write channel portion 200 of a HDD control module 12 is shown. The read/write channel portion 200 includes a CH0 module $84^{II}$, an ECC module $86^{II}$ and a DF module $23^{III}$. The read/write channel portion 200 includes a write path 202 for reception of input data 203 and a read path 204 for transmission of output data 205. The read/write channel portion 200 also includes multiple CRC modules, namely a CH0 CRC module 206, a stand alone CRC module $102^I$ and an ECC CRC module 208, which perform checks along the write path 202. The sector request queue $104^I$ may store information received from each of the read/write channel modules $84^{II}$, $86^{II}$ and $23^{III}$, as well as from each of the CRC modules 206, 208, $102^I$.

Read/write channel module communication lines 209 are shown for communication between the read/write channel modules $84^{II}$, $86^{II}$ and the DF module $23^{III}$. CRC communication lines 210 are shown for communication between the CRC modules 206, 208, $102^I$ and the DF module $23^{III}$. This provides a monitor of sector data, correction when appropriate, and an indication of when to pause or stop data transfer at various locations along the write path 202.

The CH0 module $84^{II}$ includes a byte FIFO module 211, a byte down converter 212 and a symbol FIFO module 214. The input data 203 is received and stored in the byte FIFO 211, down converted and then stored in the symbol FIFO 214.

The CH0 module $84^{II}$ also includes the CH0 CRC module 206, which performs any number of CRCs. As shown, the CH0 CRC module 206 performs a first CRC on the received data 203 and a second CRC on byte stored data 216 that is being transferred from the byte FIFO 211 to the byte down converter 212. The CH0 module $84^{II}$ further includes a byte up converter 220, which up converts run length limited (RLL) decoded data 222 from the ECC module $86^{II}$ prior to being stored in the byte FIFO 211. The up conversion is similar to and opposite that of the byte down conversion.

The CRC module $102^I$ is coupled between the CH0 module $84^{II}$ and the FCC module $86^{II}$. The CRC module $102^I$ performs a CRC on symbol stored data 224 from the symbol FIFO 214.

The ECC module $86^{II}$ includes a symbol down converter 230, a high rate RLL (HRRLL) encoder 232 and an advanced error correction code (AECC) module 234. The symbol down converter 230 converts words received from the CRC module $102^I$ to symbols, such as 10-bit symbols. The HRRLL encoder 232 receives and encodes down converted symbols 235 from the down converter 230. The HRRLL encoder 232 prevents long stretches of no transitions, and therefore decoding uncertainty. The HRRLL encoder 232 limits the amount of continuous repeated and uninterrupted 0s and 1s.

The AECC module 234 performs high rate encoding on a data portion and low rate encoding on a Reed-Solomon or parity bit portion of encoded symbols 236 received from the HRRLL encoder 232. The AECC module 234 encodes data before being written to a rotating storage medium, which provides improved recovery of ECC encoded bits. The AECC 234 may also perform permutated error correction coding.

The ECC module $86^{II}$ further includes an FCC sector FIFO module 240 that also receives the down converted symbols 235. The stored symbols may be provided to the HRRLL encoder 232 and to the ECC CRC module 208.

The FCC module $86^{II}$ also includes a symbol up converter 250, an FCC correction module 252, an ECC bus interface (BI) FIFO module 254 and a HRRLL decoder 256. The symbol up converter 250 receives and up converts AECC decoded data 260 from the rotating storage medium to generate up converted data 262. The up converted data 262 is sent to the symbol FIFO 214, which outputs up converted and stored data 264. The AECC decoded data 260 is also passed to and stored in the ECC BI FIFO 254, which outputs decoded and stored data 266. The ECC correction module 252 receives and compares the up converted and stored data 264 with the decoded and stored data 266 and corrects bit errors to generate a corrected data signal 268. The ECC correction module 252 may be in communication with the DF module $23^{II}$ via a correction signal line 270. The HRRLL decoder 256 decodes the corrected data signal, which is sent to the byte up converter 220.

The DF module $23^{III}$, for the embodiment shown, manages and controls operation of the read/write channel portion 200. The DF module $23^{III}$ provides a centralized location for the management of sectors as they advance through different pipeline stages of a read/write channel. The DF module $23^{III}$ monitors and controls the transfer of data between each of the modules $84^{II}$, $102^{I}$, $86^{II}$. The DF module $23^{II}$ also monitors the state of the data and of the modules $84^{II}$, $102^{I}$, $86^{II}$. Although the DF module $23^{II}$ is shown and described as having logic to perform the stated control and management, other modules, such as the modules $84^{II}$, $102^{I}$, $86^{II}$, in a read/write channel or elsewhere may have similar logic.

Figure 8:
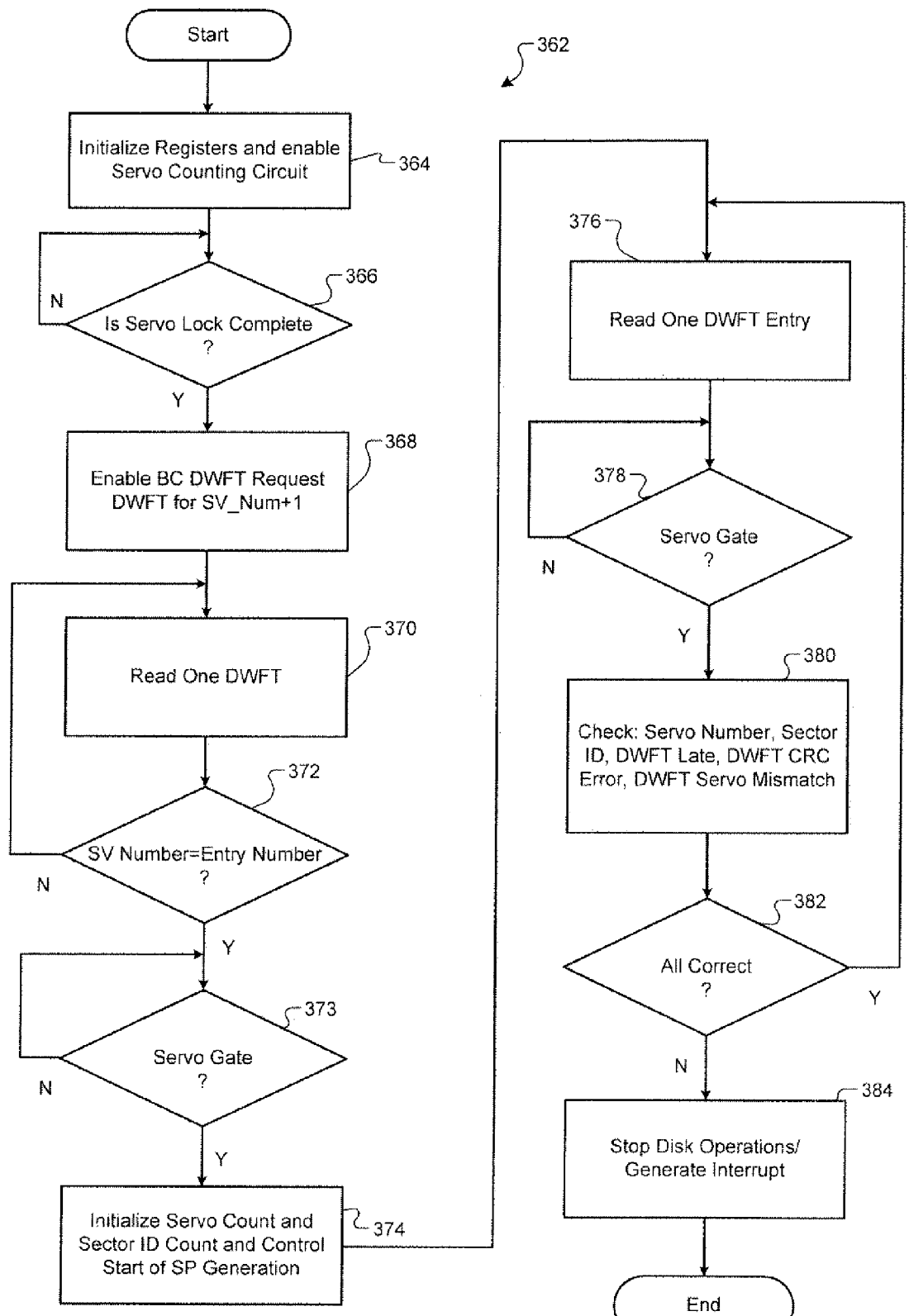
FIG. 8 is a block diagram illustrating a method of managing sector data transfer over a read/write channel in accordance with an embodiment of the present disclosure.

Referring to FIG. 8, a block diagram 362 illustrates a method for synchronizing DWFT with a position of a read/write head. Control starts in step 364 when the HDD control module initializes DF control parameter registers and enables a DWFT servo index counter module. In step 366, the DF determines that the read/write head is finished locking to a particular wedge based on a "Servo Lock Done" signal from the HDD control module. The DF may store the servo number (N) for a sector in the servo counter module at the start of a new servo lock.

In step 368, a DWFT queue fill status module of the DWFT control module may maintain a full DWFT queue by reading DWFT entries from the memory buffer DWFT whenever the DWFT queue has empty spaces. The entries may include DWFT entries for the servo number of the sector that the read/write should be over and other consecutively numbered sectors. In step 370, the DWFT synch module reads a DWFT entry from the queue. In step 372, the DWFT synch module determines whether the servo number of the servo counter module matches the servo number of the DWFT entry. If not, the DWFT synch module checks another DWFT entry against the servo number until a match is found.

In step 373, when the HDD control module generates a servo gate signal, the DF module may initialize synchronization operations in step 374. In other words, the DF may initialize the servo count of the servo counter module and the index counter module. The DF may also initialize the TSIM and CSIM and may further control timing of a sector pulse. In step 376, the DF reads a next DWFT entry.

When the HDD control module generates another servo gate in step 378, the DF may check the validity of the DWFT entry in step 380. The validity check may include checking the servo number, CRC, sector ID, whether the DWFT is late, and DWFT servo mismatch.

The DF may recheck or re-compare the servo number in the servo counter to a servo number extracted from a position of the read/write head. The DF may check the status of the CRC before using the DWFT entry. The DF checks the CRC status when a servo gate ends for one servo wedge and the DWFT entry for the next servo is available. The DF may also recheck the sector ID. The DF compares the First Sector ID supplied by the DWFT entry against the Sector ID counter after generating the first sector pulse on the wedge to determine that they match. The DF also may check that the DWFT control module delivers the DWFT entry before the end of the servo gate, i.e. that there is an entry in the DWFT queue, and the entry is not delivered late. The DF may check that a servo number in the index counter module and the servo number counter module match. The DF can read the DWFT entry for the next servo after generating the first sector pulse on the wedge. The DF may continuously monitor the Servo Lock Done signal. The DF may stop the servo counting and the sector pulse generation when the Servo Lock. Done is not asserted.

In step 382, if step 380 checks are all positive, the servo index counter module and the current sector ID module have the correct values, and control resumes in step 376. If there is no error, the DF may use the DWFT entry for the servo counting and the sector pulse generation. The DF may load a First Sector Delay to the sector pulse generation counter to generate the first sector pulse on the wedge. Otherwise, the DF halts read/write operations and generates an interrupt in step 384.

The above-described steps are meant to be illustrative examples; the steps may be performed sequentially, synchronously, simultaneously, or in a different order depending upon the application. These processes may also be performed automatically to simplify DF operations.

Although HDDs are primarily shown and described herein, the embodiments disclosed below may apply to other rotating data storage devices, such as a compact disc (CD) drive, a digital versatile disc (DVD) drive or a high definition/high data storage disc drive.

Figure 9:
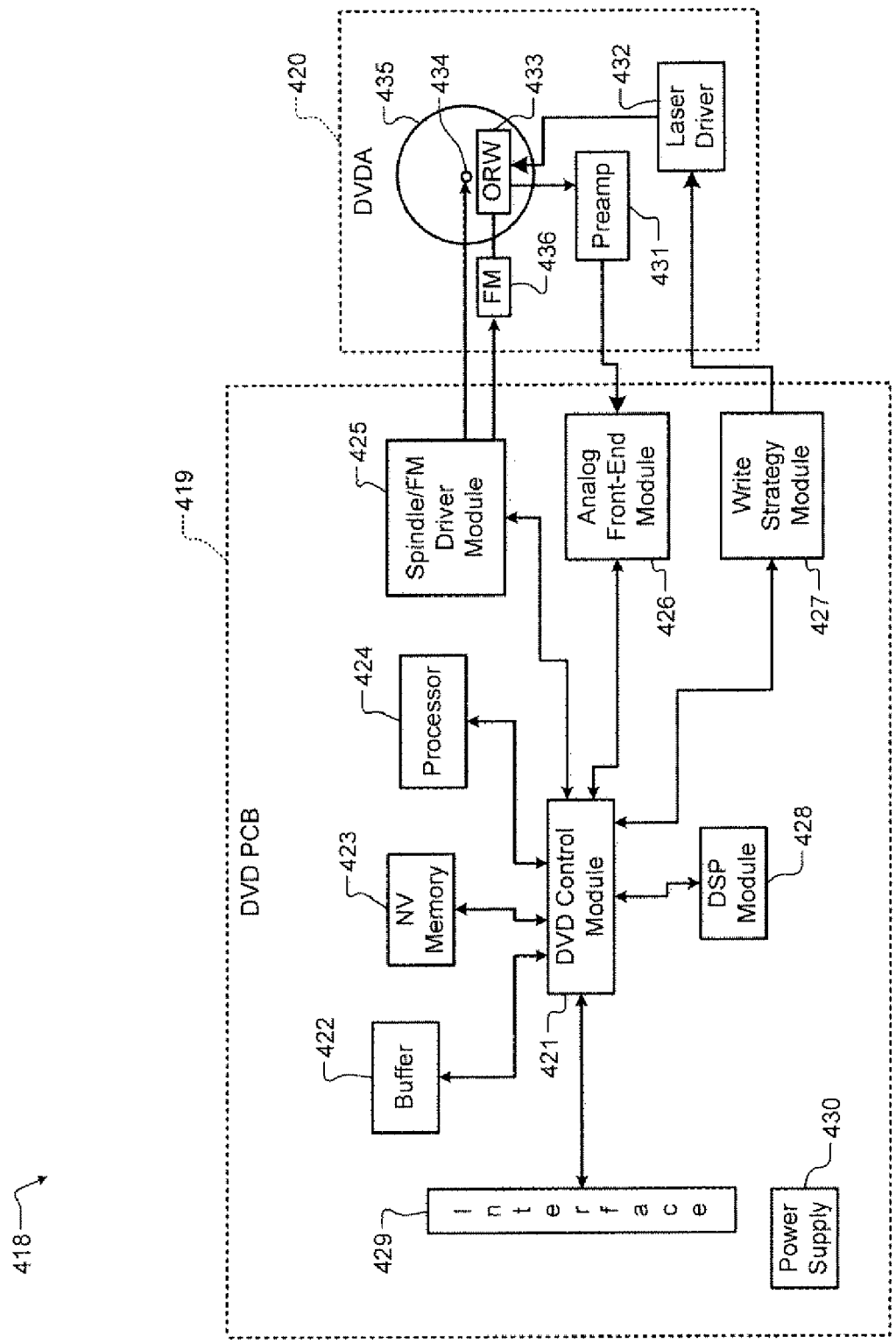
FIG. 9 is a functional block diagram of a DVD drive in accordance with an embodiment of the present disclosure.

Referring now to FIG. 9, a functional block diagram of a DVD drive is shown. The teachings of the disclosure can be implemented in a DVD control module 421 of a DVD drive 418 or of a CD drive (not shown) or other optical drive. The DVD control module 421 may include and perform synchronization of servo numbers in a disk formatter module and a DWFT as above described. The DVD drive 418 includes a DVD PCB 419 and a DVD assembly (DVDA) 420. The DVD PCB 419 includes a DVD control module 421, a buffer 422, nonvolatile memory 423, a processor 424, a spindle/FM (feed motor) driver module 425, an analog front-end module 426, a write strategy module 427, and a DSP module 428.

The DVD control module 421 controls components of the DVDA 420 and communicates with an external device (not shown) via an I/O interface 429. The external device may include a computer, a multimedia device, a mobile computing device, etc. The I/O interface 429 may include wireline and/or wireless communication links.

The DVD control module 421 may receive data from the buffer 422, nonvolatile memory 423, the processor 424, the spindle/FM driver module 425, the analog front-end module 426, the write strategy module 427, the DSP module 428, and/or the I/O interface 429. The processor 424 may process the data, including encoding, decoding, filtering, and/or formatting. The DSP module 428 performs signal processing, such as video and/or audio coding/decoding. The processed data may be output to the buffer 422, nonvolatile memory 423, the processor 424, the spindle/FM driver module 425, the analog front-end module 426, the write strategy module 427, the DSP module 428, and/or the I/O interface 429.

The DVD control module 421 may use the buffer 422 and/or nonvolatile memory 423 to store data related to the control and operation of the DVD drive 418. The buffer 422 may include DRAM, SDRAM, etc. The nonvolatile memory 423 may include flash memory (including NAND and NOR flash memory), phase change memory, magnetic RAM, or multi-state memory, in which each memory cell has more than two states. The DVD PCB 419 includes a power supply 430 that provides power to the components of the DVD drive 418.

The DVDA 420 may include a preamplifier device 431, a laser driver 432, and an optical device 433, which may be an optical read/write (ORW) device or an optical read-only (OR) device. A spindle motor 434 rotates an optical storage medium 435, and a feed motor 436 actuates the optical device 433 relative to the optical storage medium 435.

When reading data from the optical storage medium 435, the laser driver provides a read power to the optical device 433. The optical device 433 detects data from the optical storage medium 435, and transmits the data to the preamplifier device 431. The analog front-end module 426 receives data from the preamplifier device 431 and performs such functions as filtering and A/D conversion. To write to the optical storage medium 435, the write strategy module 427 transmits power level and timing data to the laser driver 432. The laser driver 432 controls the optical device 433 to write data to the optical storage medium 435.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control module for a rotating storage medium, the control module comprising:
    a memory configured to store a data wedge format table, the data wedge format table including a plurality of entries;
    a buffer control module configured to maintain a queue separate from the data wedge format table, wherein each of a plurality of entries of the queue is based on a corresponding one of the plurality of entries fetched by the buffer control module from the data wedge format table, and wherein each of the plurality of entries of the queue includes a servo number; and
    a disk formatter module configured to compare the servo numbers of the plurality of entries of the queue to present servo information, wherein the present servo information is based on a present position of a read/write device in relation to the rotating storage medium.

2. The control module of claim 1, wherein the servo numbers of the plurality of entries of the queue are sequential.

3. The control module of claim 1, wherein the disk formatter module is configured to select one of the plurality of entries of the queue in response to a correspondence between (i) the servo number of the one of the plurality of entries of the queue and (ii) the present servo information.

4. The control module of claim 1, wherein the buffer control module is configured to selectively fill multiple entries in the queue during a single request to the memory.

5. The control module of claim 1, wherein the buffer control module comprises a fill status module configured to determine whether the queue is full.

6. The control module of claim 5, wherein the buffer control module comprises a request module configured to request entries from the data wedge format table in response to signals from the fill status module.

7. The control module of claim 1, wherein the buffer control module comprises:
    an index counter; and
    an index counter controller configured to (i) increment the index counter and (ii) associate the servo numbers with the plurality of entries of the queue.

8. The control module of claim 1, further comprising an error checking module configured to perform a cyclical redundancy check (CRC) on each of the plurality of entries of the queue.

9. The control module of claim 1, wherein the disk formatter module comprises a servo counter module configured to determine the present servo information.

10. The control module of claim 1, wherein the disk formatter module is configured to, prior to comparing the servo number of one of the plurality of entries of the queue, perform a validation check of the one of the plurality of entries of the queue.

11. The control module of claim 1, wherein the buffer control module creates each of the plurality of entries of the queue by appending additional information to the corresponding one of the plurality of entries of the data wedge format table, wherein the additional information includes the servo number.

12. The control module of claim 11, wherein the additional information further includes a status indicator based on a cyclic redundancy check (CRC) of the corresponding one of the plurality of entries of the data wedge format table.

13. A method for controlling a rotating storage medium, the method comprising:
    storing, in a memory, a data wedge format table having a plurality of entries;
    maintaining a queue separate from the data wedge format table;
    generating each of a plurality of entries for the queue based on a corresponding one of the plurality of entries fetched from the data wedge format table, wherein each of the plurality of entries of the queue includes a servo number;
    determining present servo information based on a present position of a read/write device in relation to the rotating storage medium; and
    comparing the servo numbers of the plurality of entries of the queue to the present servo information.

14. The method of claim 13, wherein the servo numbers of the plurality of entries of the queue are sequential.

15. The method of claim 13, further comprising selecting one of the plurality of entries of the queue in response to a correspondence between (i) the servo number of the one of the plurality of entries of the queue and (ii) the present servo information.

16. The method of claim 13, further comprising selectively filling multiple entries in the queue during a single request to the memory.

17. The method of claim 13, further comprising:
    determining whether the queue is full; and
    requesting entries from the data wedge format table in response to the queue being determined to be less than full.

18. The method of claim 13 further comprising associating the servo numbers with the plurality of entries of the queue.

19. The method of claim 13, further comprising generating each of the plurality of entries of the queue by appending additional information to the corresponding one of the plurality of entries of the data wedge format table, wherein the additional information includes the servo number.

20. The method of claim 19, wherein the additional information further includes a status indicator based on a cyclic redundancy check (CRC) of the corresponding one of the plurality of entries of the data wedge format table.

* * * * *